US007046809B1

United States Patent
Park (10) Patent No.: US 7,046,809 B1
(45) Date of Patent: May 16, 2006

(54) DEVICE AND METHOD FOR SCRAMBLING/DESCRAMBLING VOICE AND DATA FOR MOBILE COMMUNICATION SYSTEM

(75) Inventor: Jung Jin Park, Ichon (KR)

(73) Assignee: UTStarcom, Inc., Alameda, CA (US)

(*) Notice: Subject to any disclaimer, the term of this patent is extended or adjusted under 35 U.S.C. 154(b) by 695 days.

(21) Appl. No.: 09/718,220

(22) Filed: Nov. 21, 2000

(30) Foreign Application Priority Data

Dec. 17, 1999 (KR) ................................ 1999-58711

(51) Int. Cl.
*H04B 14/04* (2006.01)
(52) U.S. Cl. ...................................... 380/275; 375/242
(58) Field of Classification Search ................ 380/275; 375/242

See application file for complete search history.

(56) References Cited

U.S. PATENT DOCUMENTS

| 4,937,867 A | * | 6/1990 | Kasparian et al. ............. 380/35 |
| 4,959,863 A | * | 9/1990 | Azuma et al. ................ 704/272 |
| 5,278,907 A | | 1/1994 | Snyder et al. |
| 5,528,693 A | * | 6/1996 | Leopold ...................... 380/274 |
| 5,550,809 A | | 8/1996 | Bottomley et al. |
| 5,617,476 A | * | 4/1997 | Ibaraki et al. .............. 380/267 |
| 5,850,602 A | | 12/1998 | Tisdale et al. |
| 6,034,994 A | * | 3/2000 | Yoon .......................... 375/242 |
| 6,658,112 B1 | * | 12/2003 | Barron et al. ................ 380/275 |
| 6,658,250 B1 | * | 12/2003 | Ganesan et al. ......... 455/426.1 |

FOREIGN PATENT DOCUMENTS

| JP | 55-063150 | 5/1980 |
| JP | 63-193694 | 8/1988 |
| JP | 06-311233 | 11/1994 |

* cited by examiner

*Primary Examiner*—Ayaz Sheikh
*Assistant Examiner*—Taghi T. Arani
(74) *Attorney, Agent, or Firm*—McDonnell Boehnen Hulbert & Berghoff LLP (57) ABSTRACT

The device and method for scrambling/descrambling voice/data in a mobile communication system involves vocoding or bypassing a signal received from a radio channel interval, scrambling the vocoded or bypassed signal using a random number, sending the scrambled signal to a cable channel interval, descrambles the scrambled signal received from the cable channel interval, vocoding or bypassing the descrambled signal, and sending the vocoded or bypassed signal to the radio channel interval, thereby dramatically security of the data in the cable channel interval between the system vocoders and preventing overhearing of the voice.

12 Claims, 6 Drawing Sheets

DEVICE AND METHOD FOR SCRAMBLING/DESCRAMBLING VOICE AND DATA FOR MOBILE COMMUNICATION SYSTEM

BACKGROUND OF THE INVENTION

1. Field of the Invention

The present invention relates to vocoding voice and data in a mobile communication system and, more particularly, to a device and method for scrambling/descrambling voice and data for a mobile communication system whereby communication signals on a cable channel can be scrambled and descrambled irrespective of the operational mode of a system vocoder in a digital mobile communication system during voice data transmission between mobile stations with the vocoder.

2. Description of the Related Art

Generally, voice is transmitted after compression in a digital mobile communication system in order to support a large number of mobile stations within a limited capacity of radio channels. For voice compression, there is used a voice scrambling algorithm, normally, a vocoding algorithm in the field of the mobile communication system because the vocoding algorithm is characterized by low data rate and voice quality for the cable network. The vocoding algorithm, which is an error-containing algorithm, produces more errors between the restored voice and the original one with an increase in the number of iterative compression and restorations. That is, the tone quality of the restored voice deteriorates.

Figure 1:
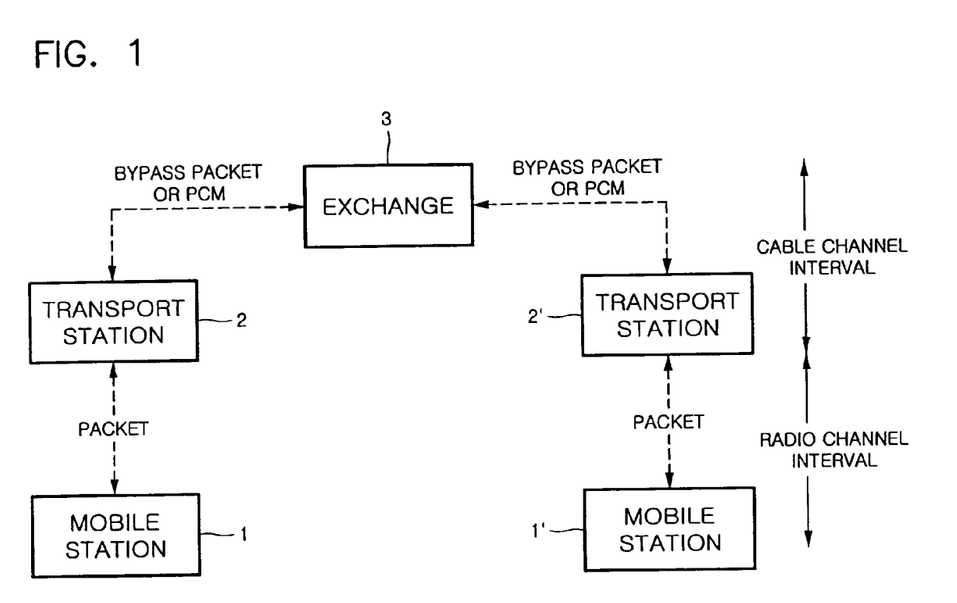
FIG. 1 is a diagram for explaining interval-based transmission pattern between mobile stations in a general mobile communication system.

FIG. 1 is a diagram for explaining interval-based transmission of voice and data between mobile stations in a general mobile communication system.

As illustrated in the figure, when an originating mobile station 1 compresses voice and transmits the compressed voice to a transport station 2 in the form of packet, then a vocoder (not shown) in the transport station 2 restores the packet to data in the PCM (Pulse Code Modulation) form. The PCM data are sent to a transport station 2' serving a target mobile station 1' via an exchange 3 and then recompressed at the vocoder provided in the transport station 2'. Here, the transport station 2 includes a base station controller and a base station. The compressed packet is sent to the target mobile station 1' via a radio channel.

The mobile station 1' restores the received packet with an internal vocoder. Through these procedures, the mobile station can receive voice from the originating mobile station.

Finally, the voice undergoes two vocoding steps during transmission between the two mobile stations. In this event, the voice packet compressed and transmitted from the originating mobile station 1 via a radio channel is packet-bypassed at the system vocoder, thereby reducing the number of vocoding steps and decreasing deterioration of tone quality. This packet bypass process is also utilized in data transmission. Here, between the mobile station 1 or 1' and the transport station 2 or 2' is the radio channel interval and between the transport station 2 or 2' and the exchange 3 is the cable channel interval.

Now, a description will be given to a device for vocoding voice signals according to prior art with reference to FIG. 2.

Figure 2A:
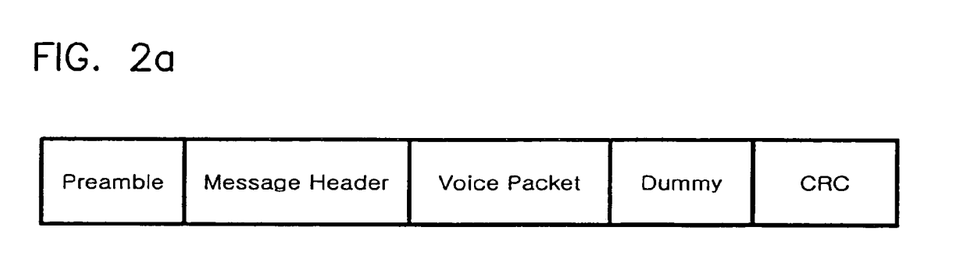
FIG. 2a shows the format of a bypassed voice packet and FIG. 2b shows the format of a bypassed data packet.
Figure 2B:
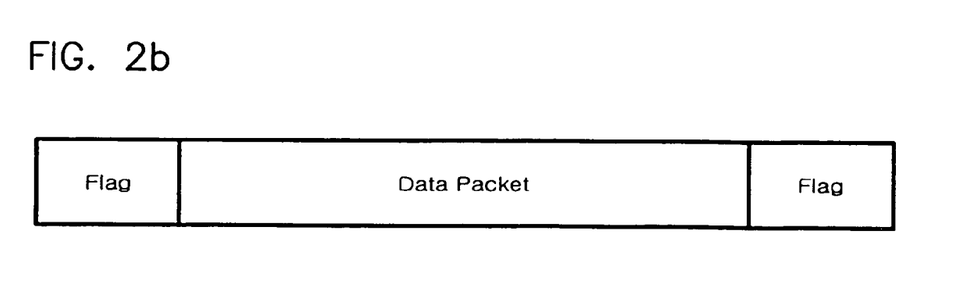
Figure 3:
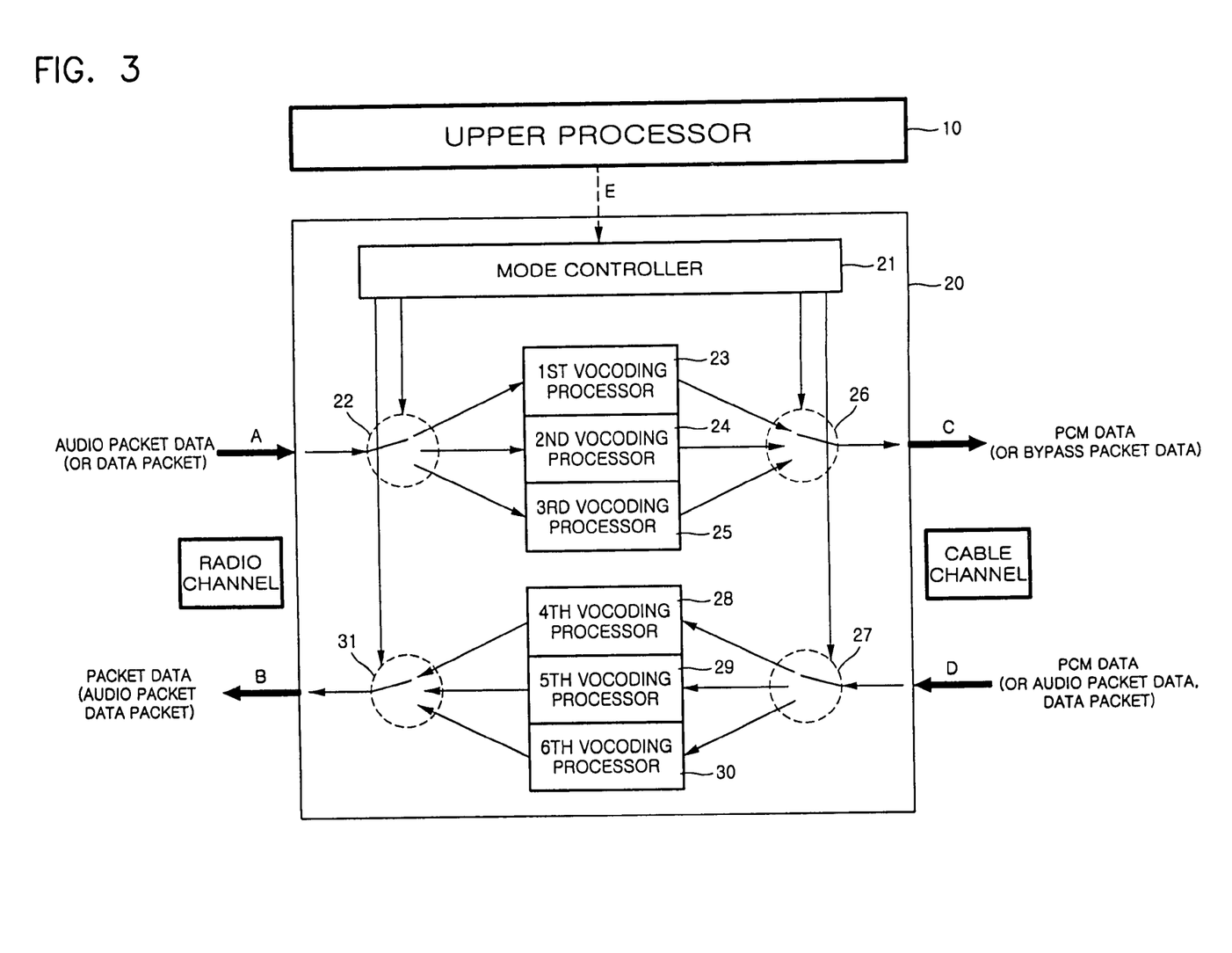
FIG. 3 is a schematic block diagram of the vocoding device based on an operational mode in a mobile communication system according to prior art.

FIG. 2 presents the patterns of a packet bypassed at the vocoder in a general mobile communication system, wherein FIG. 2a shows the format of the bypassed voice packet and FIG. 2b shows the format of the bypassed data packet. FIG. 3 is a schematic block diagram of a vocoding device in the respective operational modes in a mobile communication system according to prior art.

First, the vocoding device in the mobile communication system includes a vocoder 20 and an upper processor 10. The upper processor 10 includes the entire of the transport stations 2 and 2' and the exchange 3, except the vocoder 20.

The vocoder 20 includes first to fourth mode switching blocks 22, 26, 27 and 31 and first to sixth vocoding processors 23, 24, 25, 28, 29 and 30 for performing a mode-based vocoding.

The above-configured vocoding device in the mobile communication system according to the prior art operates in three operational modes during data transmission between the mobile stations.

The first operational mode is enabled when the vocoders in the mobile stations are distinct, for example, 8 Kbps EVCR (Enhanced Variable Code Rate) and 13 Kbps QCELP (Qualcomm Code Excited Linear Predictive) vocoders, in which mode the system vocoders perform a normal vocoding process, i.e., voice scrambling and descrambling. In this event, the pattern of the transmission data is packet data on the radio channel (i.e., a transmission line between the mobile station and the system vocoder), and PCM data on the cable channel (i.e., a transmission line between the system vocoders between which the exchange is interposed).

The second operational mode is enabled when the vocoders in the mobile stations are identical, for example, EVCT vocoders or QCLP vocoders, in which case the system vocoders operate in a voice packet bypass mode. In this event, the pattern of the transmission data is packet data on the radio channel, and bypassed voice packet data as shown in FIG. 2a on the cable channel.

The third operational mode is enabled during data transmission between the mobile stations, in which mode the system vocoders operate in a data packet bypass mode. In this event, the pattern of the transmission data is packet data on the radio channel, and bypassed data packet as shown in FIG. 2b on the cable channel.

The conventional vocoding system operating in the above-stated three operational modes is illustrated in FIG. 3.

As show in FIG. 3, the vocoder 20 receives mode information "E" from the upper processor 10 and operates in the corresponding mode under the control of the mode controller 21.

For example, when the vocoder 20 receives the first mode information from the upper processor 10, the mode controller 21 switches the switching blocks 22 and 26 to the first vocoding processor 23, which vocodes voice packet data transferred from the originating mobile station via a radio channel "A" into PCM data and sends the PCM data to the exchange via a cable channel "C". The mode controller 21 also switches the switching blocks 27 and 31 to the fourth vocoding processor 28, which vocodes the PCM data transferred from the exchange via a cable channel "D" into packet data and sends the packet data to the target mobile station via a radio channel "B".

If the vocoder 20 receives the second mode information from the upper processor 10, the mode controller 21 switches the switching blocks 22 and 26 to the second vocoding processor 24, which bypasses voice packet data transferred from the originating mobile station via the radio channel "A" and sends the bypassed voice packet data to the exchange via the cable channel "C". The mode controller 21 also switches the switching blocks 27 and 31 to the fifth vocoding processor 29, which bypasses voice packet data transferred from the exchange via the cable channel "D" and sends the bypassed voice packet data to the target mobile station via the radio channel "B".

When the vocoder 20 receives the third mode information from the upper processor 10, the mode controller 21 switches the switching blocks 22 and 26 to the third vocoding processor 25, which bypasses data packet transferred from the originating mobile station via the radio channel "A" and sends the bypassed data packet to the exchange via the cable channel "C". The mode controller 21 also switches the switching blocks 27 and 31 to the sixth vocoding processor 30, which bypasses data packet transferred from the exchange via the cable channel "D" and sends the bypassed data packet to the target mobile station via the radio channel "B".

As such, the vocoder 20 communicates packets on the radio channels "A" and "B" as well as mode information with the upper processor 10 to perform an adequate processing based on the mode information, and communicates bypassed packet data and PCM data as shown in FIG. 2 on the cable channels "C" and "D" based on the operational mode.

The upper processor 10 not only controls the vocoder 20 but also enables packet communication between the mobile station and the system vocoder through the radio channels.

However, the vocoding system according to the prior art involves a problem in that the voice data on the cable channels are susceptible to overhearing while the system vocoders is operating in the respective modes.

For example, in the first operational mode, i.e., normal vocoding mode, the PCM data on the cable channels are ready to be overheard by an overhearing instrument.

In the second operational mode, i.e., voice packet bypass mode, the bypassed voice packet data are not easy to overhear by a general PCM overhearing method but susceptible to overhearing, because the voice packets are positioned in the predefined fields in a given order, as shown in FIG. 2a, with a limited number of cases for finding a specific voice packet among the entire bypassed voice packets at a position.

In the third operational mode, i.e., data packet bypass mode, the data packets can be extracted simply by eliminating a flag field having the same pattern, because the bypassed data packets iteratively appear on the cable channels, as shown in FIG. 2b.

SUMMARY OF THE INVENTION

It is, therefore, an object of the present invention to provide a device for scrambling/descrambling voice and data in a mobile communication system, in which a transmitter system vocoder has an scrambling function to scramble a communication signal on a cable channel and a receiver system vocoder has a descrambling function to descramble the scrambled data, thereby preventing overhearing of the voice data.

It is another object of the present invention to provide a method for scrambling/descrambling voice and data corresponding to the operation of the vocoder.

Specifically, the object of the present invention is to provide a device and method for scrambling/descrambling voice and data in a mobile communication system, in which the system vocoders are provided with a scrambler and a descrambler to scramble a communication signal and descramble the scrambled signal using the same scrambling key received from the upper processor, in order to prevent overhearing of voice and data drain on cable channels.

To achieve the above object of the present invention, in a voice/data vocoding device for a mobile communication system, a device for scrambling voice and data in the mobile communication system includes: a controller for generating an operational mode control signal to control an operational mode of the voice and data, a scrambling key feeding control signal to control data scrambling, and a sync signal generation control signal; an operational mode processor for vocoding or bypassing a voice/data packet received from a radio channel interval, based on the operational mode control signal of the controller; a random number generator for generating a random number based on the scrambling key feeding control signal of the controller; a sync signal transmitter for generating a sync signal based on the sync signal generation control signal of the controller, and sending the generated sync signal to a cable channel interval; and a scrambler for scrambling a vocoded PCM (pulse code modulation) signal or a bypassed voice/data packet of the operational mode processor using the random number generated from the random number generator and, after complete transmission of the sync signal, sending the scrambled PCM signal or voice/data packet to the cable channel interval.

In another aspect of the present invention, there is provided a device for descrambling voice and data in a mobile communication system including: a sync signal detector for detecting a sync signal from an scrambled signal received from a cable channel interval; a controller for generating a descrambling control signal, an operational mode control signal, and a descrambling key feeding control signal, upon detection of the sync signal at the sync signal detector; a random number generator for generating a random number based on the descrambling key feeding control signal of the controller; a descrambler for descrambling the scrambled signal received from the cable channel interval using the random number generated from the random number generator, based on the descrambling control signal of the controller; and an operational mode processor for vocoding a descrambled PCM signal of the descrambler into a packet or bypassing a voice/data packet, based on the operational mode control signal of the controller, and then sending the vocoded PCM signal or the bypassed voice/data packet to a radio channel interval.

In further another aspect of the present invention, there is provided a device for scrambling/descrambling voice and data in a mobile communication system including: an operational mode processor for vocoding or bypassing a voice/data packet received from a radio channel interval based on a received operational mode signal, and vocoding or bypassing a descrambled PCM signal or packet based on the operational mode signal; a random number generator for generating a random number based on a received scrambling and descrambling key feeding control signal; a sync signal transmitter for generating a sync signal based on a received control signal, and sending the generated sync signal to a cable channel interval; a scrambler for scrambling the vocoded PCM signal or the bypassed voice/data packet of the operational mode processor using the random number generated from the random number generator and, after complete transmission of the sync signal, sending the scrambled PCM signal or voice/data packet to the cable channel interval; a sync signal detector for detecting a sync signal from the scrambled signal received from the cable channel interval; a descrambler for descrambling the scrambled signal received from the cable channel interval using the random number generated from the random number generator, based on a received descrambling control signal; and a controller for generating the descrambling control signal to the descrambler, the scrambling and descrambling key feeding control signal, and the sync signal generation control signal, upon detection of the sync signal at the sync signal detector.

In still further another aspect of the present invention, there is provided a method for scrambling voice and data in a mobile communication system including the steps of: vocoding or bypassing a voice/data packet received from a radio channel interval based on a received operational mode signal; generating a defined random number based on scrambling key information; generating a sync signal and sending the generated sync signal to a cable channel interval; and upon complete transmission of the sync signal, scrambling the mode-processed signal (including a PCM signal, or bypassed voice/data packet) using the random number and sending the scrambled signal to the cable channel interval.

In still further another aspect of the present invention, there is provided a method for descrambling voice and data in a mobile communication system including the steps of: receiving an scrambled signal from a cable channel interval; upon receiving the scrambled signal, detecting a sync signal from the scrambled signal; upon detection of the sync signal, generating a random number based on a descrambling key signal; descrambling the scrambled signal using the random number; and vocoding a descrambled PCM signal or bypassing a descrambled packet based on an operational mode signal, and sending the vocoded PCM signal or the bypassed packet to a radio channel interval.

BRIEF DESCRIPTION OF THE DRAWINGS

FIG. 2 presents the bypassed packet pattern of a vocoder in a general mobile communication system, wherein

DETAILED DESCRIPTION OF THE PREFERRED EMBODIMENT

Hereinafter, a detailed description will be given to a device and method for scrambling/descrambling voice and data in a mobile communication system according to the present invention with reference to the accompanying drawings.

First, in the present invention, there are three patterns of the communication signal delivered on cable channels according to the operational mode of a system vocoder during communication between mobile stations. That is, in the voice communication, the transmission data has a pattern of PCM signal when the system vocoder operates in a normal vocoding mode, and bypassed voice packet when the system vocoder operating in a voice packet bypass mode.

Meanwhile, in the data communication, the system vocoder operates in a data packet bypass mode and the transmission data has a pattern of bypassed data packet on the cable channels.

The present invention enables a scrambling/descrambling operation for all patterns of the transmission data.

Figure 4:
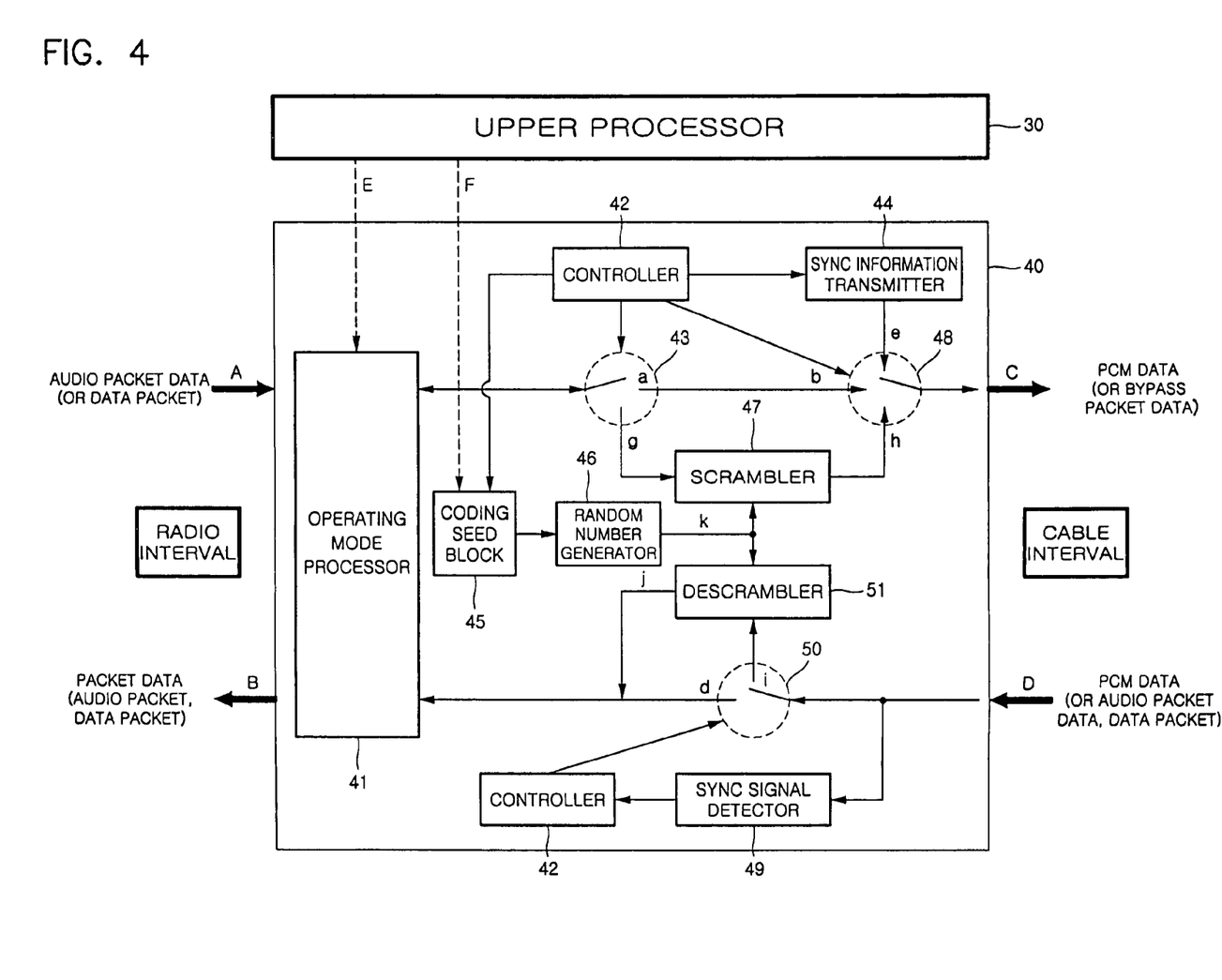
FIG. 4 is a schematic block diagram of a device for scrambling/descrambling voice and data in a mobile communication system according to the present invention.

FIG. 4 is a schematic block diagram of a vocoding system for scrambling/descrambling voice/data in a mobile communication system according to the present invention.

As illustrated in the figure, the vocoding system comprises: an upper processor 30 for providing operational mode information and scrambling key information; an operational mode processor 41 for processing voice/data packet received on a radio channel "A" from an originating mobile station in a vocoding mode or a bypass mode based on the operational mode information received from the upper processor 30, or processing descrambled signals as a packet in the vocoding mode or the bypass mode, and sending the processed packet to a target mobile station via a radio channel "B"; a controller 42 for storing the scrambling key information received from the upper processor 30, and generating a scrambling key information storage control signal, a scrambling key information output control signal, a sync signal transmission control signal and a switching control signal to output the stored scrambling key; and a scrambling key seed block 45 for storing the scrambling key information received from the upper processor based on the storage control signal from the controller 42, and outputting the stored scrambling key information based on the output control signal.

The vocoding system further comprises: a first switching block 43 for switching the operational mode from a normal mode to a scrambling mode based on the control signal received from the controller 42; a random number generator 46 for generating a random number based on the scrambling key information received from the scrambling key seed block 45; a scrambler 47 for scrambling the packet or PCM signal mode-processed (i.e., vocoded or bypassed) at the operational mode processor 41 based on the random number generated from the random number generator 46; a sync signal transmitter 44 for generating and sending a sync signal based on the sync signal transmission control signal received from the controller 42; and a second switching block 48 for sending the sync signal received from the sync signal transmitter 44 and then switching the scrambled signal from the scrambler 47, thereby sending the scrambled data to an exchange via a cable channel "C".

The vocoding system further comprises: a sync signal detector 49 for detecting a sync signal from the scrambled signal received via a cable channel "D"; a third switching block 50 for switching the operational mode from a normal mode to a descrambling mode based on the control signal of the controller 42, upon detection of the sync signal at the sync signal detector 49; and a descrambler 51 for descrambling the scrambled signal received based on the switching operation of the third switching block 50, and sending the descrambled signal to the operational mode processor 41.

A detailed description will now be given to an operation of the above-structured voice/data scrambling/descrambling device in a mobile communication system according to the present invention.

First, the vocoder 40 receives operational mode information "E" and scrambling key information "F" from the upper processor 30. Then, the operational mode processor 41 and the controller 42 in the vocoder 40 generate various control signals.

That is, the controller 42 stores the scrambling key in the scrambling key seed block 45 and outputs the stored scrambling key read out from the scrambling key seed block 45 to the random number generator 46. The controller 42 also switches the first switching block 43 from stage "a" to stage "g".

The random number generator 46 generates a random number based on the scrambling key received from the scrambling key seed block 45 and applies the generated random number to the scrambler 47.

According to the switching operation of the first switching block 43, the scrambler 47 scrambles the bypassed packet or vocoded PCM signal received from the operational mode processor 41 based on the random number received from the random number generator 46, and outputs the scrambled packet or PCM signal to the second switching block 48.

The controller 42 provides a control signal to the sync signal transmitter 44 and a switching control signal to the second switching block 48 so as to send the sync signal of the sync signal transmitter 44 to the cable channel interval. Once the sync signal is sent to the cable channel interval, the controller 42 switches from the second switching block 48 to the scrambler 47 to send the scrambled signal from the scrambler 47 to the cable channel interval.

Here, the sync signal is transmitted once prior to sending the scrambled signal for the first frame to the cable channel interval, and never transmitted for all subsequent frames.

Meanwhile, upon receiving scrambled data in the cable channel interval, the sync signal detector 49 of the vocoder 40 detects the sync signal from the received scrambled signal and applies the detection result to the controller 42.

Once the sync signal detector 49 detects the sync signal, the controller 42 switches the third switching block 50 from stage "d" to stage "i".

Consequently, the scrambled signal undergoes the reverse processing of the scrambling, i.e., the signal is descrambled based on the random number output from the random number generator 46. Thus descrambled packet or PCM signal is applied to the operational mode processor 41.

The operational mode processor 41 performs a vocoding or bypass operation based on the operational mode information received from the upper processor 30 and sends the bypassed packet or vocoded PCM signal to the radio channel interval.

A further detailed description will now be given to the scrambling and descrambling operations.

Once the vocoder 40 receives operational mode information and scrambling key information from the upper processor 30, the operational mode processor 41 and the controller 42 generate control signals from the information. That is, the controller 42 stores a scrambling key in the scrambling key seed block 45 and outputs the stored scrambling key to the random number generator 46.

The random number generator 46 generates a random number based on the scrambling key received from the scrambling key seed block 45. The random number is used as information for scrambling or descrambling the input/output communication signals of the vocoder 40. The information corresponds to the positional information of the input/output communication signals of the vocoder 40, the positional information being fed into the scrambler 47 and the descrambler 51.

The scrambler 47 uses the positional information generated from the random number generator 46 to rearrange the position of the communication signal "g" output from the operational mode processor 41 in the unit of bits or bytes. Here, the scrambling performance is higher when rearranging the communication signal in the unit of bits rather than in the unit of bytes. The scrambler 47 combines the rearranged signal "h" with the sync signal generated from the sync signal transmitter 44 and outputs the composite signal to an output "C" of the vocoder 40, thereby sending the scrambled signal on the cable channel.

The descrambler 51 uses the positional information generated from the random number generator 46 to rearrange the scrambled signal "d" on the cable channel interval "D" by the reverse process of the scrambling shown in Table 1, thus descrambling the original signal "j". An example of the descrambling process will now be described with reference to Table 1.

TABLE 1

| Original Position | 0 | 1 | 2 | 3 | 4 | 5 | 6 | 7 | 8 | 9 |
|---|---|---|---|---|---|---|---|---|---|---|
| Communication Signal | X0 | X1 | X2 | X3 | X4 | X5 | X6 | X7 | X8 | X9 |
| Random Number | 1 | 3 | 5 | 7 | 2 | 9 | 8 | 4 | 6 | 0 |
| Rearranged Signal | X0 | X3 | X5 | X7 | X2 | X9 | X8 | X4 | X6 | X0 |

Expediently, it is assumed that the communication signal "g" is rearranged (scrambled) in the unit of 10 bytes, generating ten random numbers "k" ranging from position 0 to position 9. Once a random number is generated as shown in Table 1, in which the first random number is "1", the communication signal X1 at position "1" is shifted to the first position (i.e., position "0"). As the second random number is "3", the communication signal at position "3", i.e., X3 is disposed at the second position (i.e., position "1"). Similarly, as the final random number is "0", the communication signal X0 at position "0" is moved to position "9". This procedure obtains the rearranged signals as listed in the bottom row, which signals are scrambled signals.

The descrambling process is a reverse procedure of the scrambling process, which means that the original communication signals can be easily rearranged.

The scrambling start time must be in conformity with the descrambling start time so that the respective vocoders at the transmitter and the receiver of the system can descramble the scrambled signals accurately. That is, considerations of transmission delay of the communication signal in the cable channel interval between the system vocoders are important in descrambling the signals. The methods for solving this problem may depend on the design and configuration of the system. The present invention employs a descrambling method applicable to any system configuration, in which method the sync signal transmitter 44 sends the sync information for the operating time of the scrambler 47 and the descrambler 51 to the second witching block 48 through the cable channels before the scrambler 47 transmits the scrambled signal.

Simultaneously, the descrambler 51 descrambles the scrambled signal by the above-stated descrambling method after detection of the sync signal received from the cable channel "D".

This eliminates inconformity of the driving time between the scrambler 47 and the descrambler 51 that may be caused due to transmission delay of the communication signal between the vocoders at the transmitter and the receiver on the cable channel, thereby enabling accurate scrambling of the communication signal and descrambling the scrambled signal using the same scrambling key. Here, the sync information has a defined pattern previously negotiated between the system vocoders.

Figure 5A:
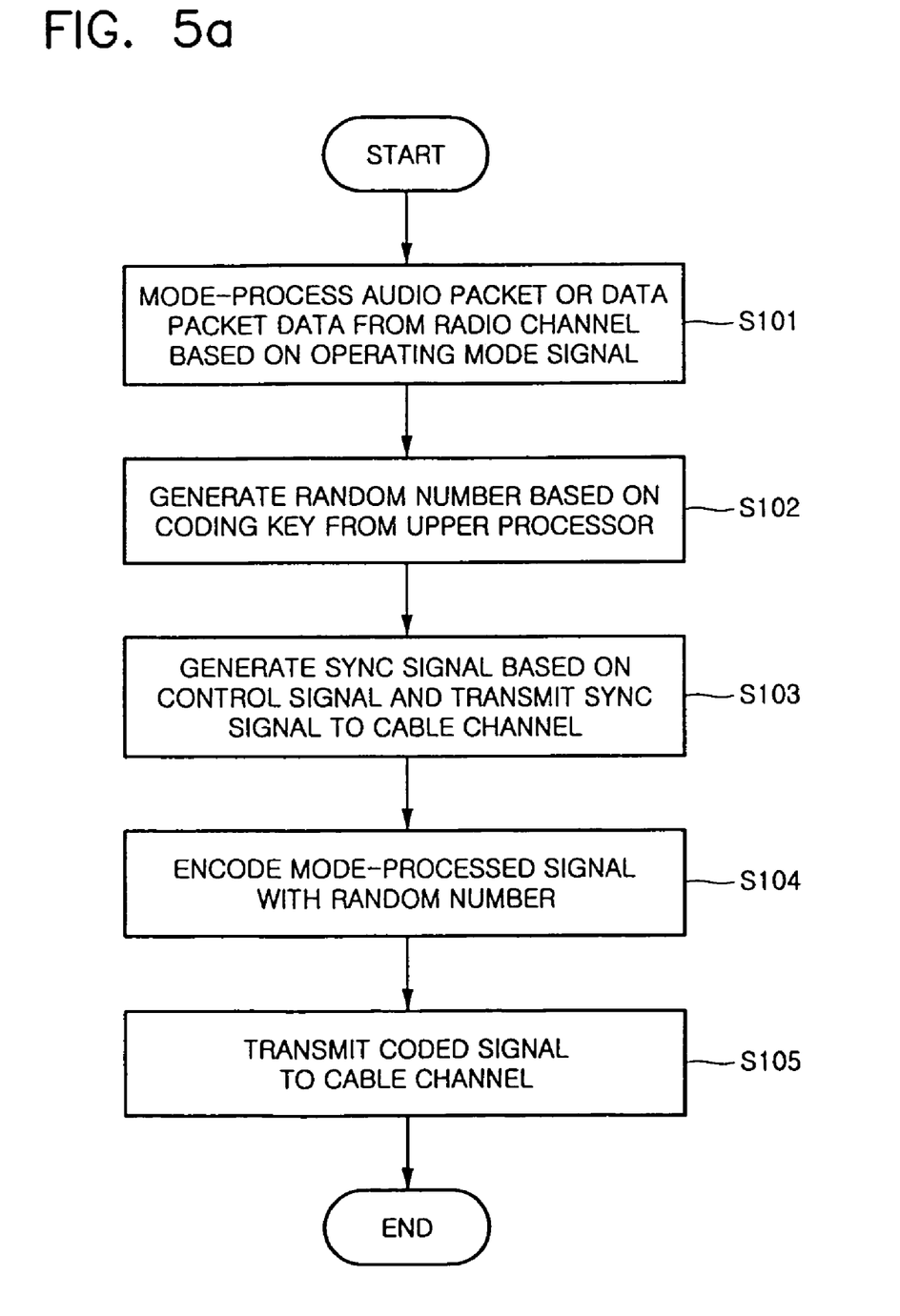
FIGS. 5a and 5b are flow charts for explaining a method for scrambling/descrambling voice and data in a mobile communication system according to the present invention.
Figure 5B:
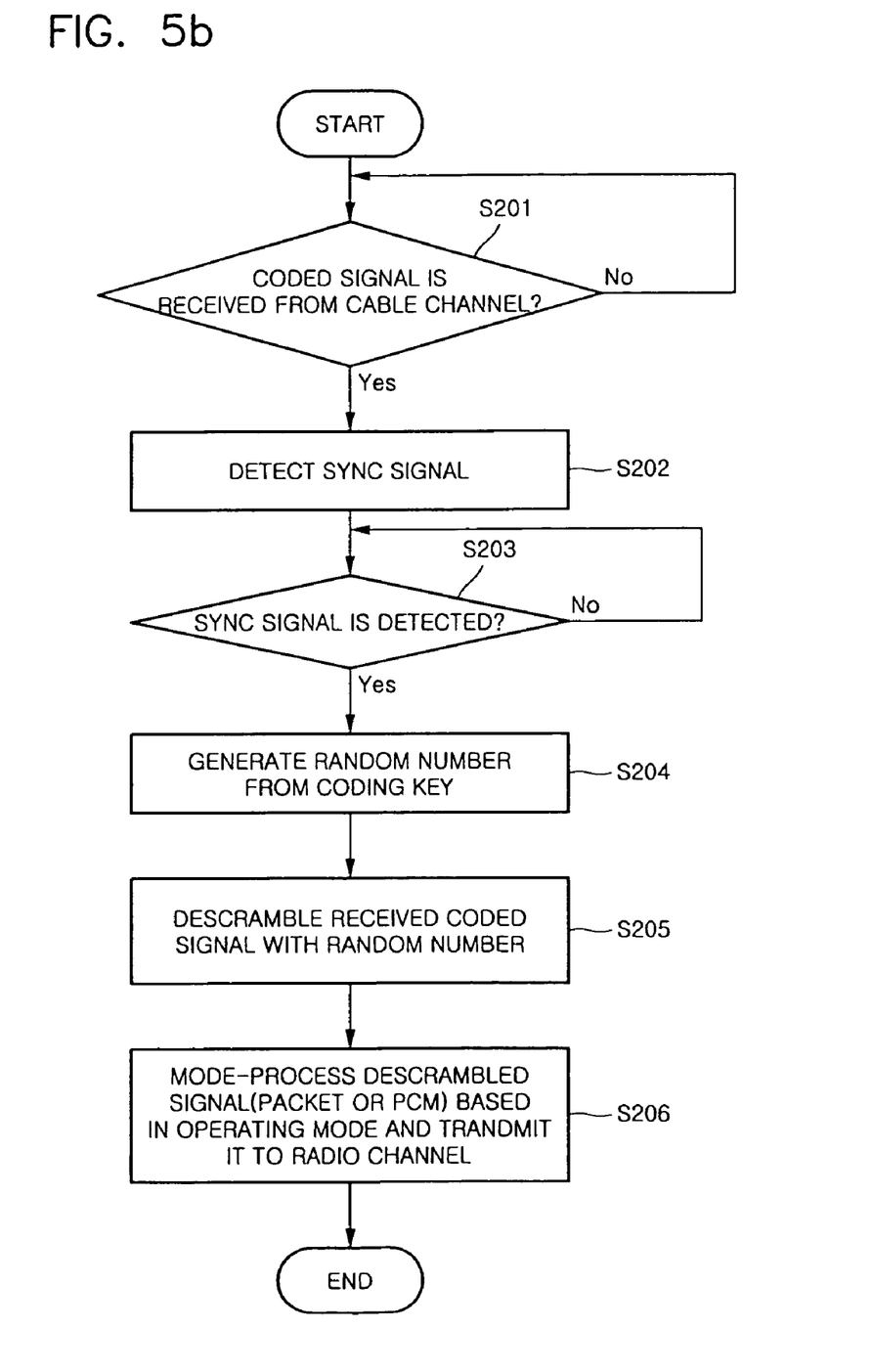

A stepwise description will be given to a voice/data scrambling and descrambling method for a mobile communication system according to the present invention with reference to FIG. 5.

The voice/data scrambling method in a mobile communication system will be described in connection with FIG. 5a.

First, step S101 mode-processes the voice packet or data packet received from the radio channel interval based on the operational mode information supplied by the upper processor 30. That is, the voice packet is vocoded into PCM data, or the voice/data packet is bypassed, based on the corresponding operational mode.

Step S102 generates a random number based on the scrambling key information applied from the upper processor 30.

Step S103 generates a sync signal and sends the generated sync signal to the cable channel interval. After completion of the transmission of the sync signal, step S104 scrambles the mode-processed signal (e.g., PCM data, or bypassed voice packet or data packet) using the random number.

Step S105 sends the scrambled signal in the cable channel interval.

Next, a stepwise description will be given to a method for descrambling the scrambled signal received from the cable channel interval with reference to FIG. 5b.

First, step S201 determines whether a scrambled signal is received from the cable channel interval.

Once the scrambled signal is received, step S202 detects a sync signal from the scrambled signal.

Step S203 determines whether the sync signal is detected, and upon detection of the sync signal, step S204 generates a defined random number based on a scrambling key supplied.

Subsequently, step S205 descrambles the received scrambled signal based on the random number, and step S206 mode-processes the descrambled signal, i.e., PCM or packet based on the operational mode information, thereafter sending the mode-processed packet to the radio channel interval. Here, the corresponding mode enables an operation for converting the descrambled PCM signal to a packet or bypassing the scrambled packet.

As described above, the "device and method for scrambling/descrambling voice/data in a mobile communication system" according to the present invention involves vocoding or bypassing the signal received from a radio channel interval, scrambling the vocoded or bypassed signal using a random number, sending the scrambled signal to a cable channel interval, descrambles the scrambled signal received from the cable channel interval, vocoding or bypassing the descrambled signal, and sending the vocoded or bypassed signal to the radio channel interval, thereby dramatically security of the data in the cable channel interval between the system vocoders and preventing overhearing of the voice.

Furthermore, the application of the present invention is expandable to the radio channel interval between the mobile station and the vocoder, thus providing security of data over all channels.

It is to be noted that like reference numerals denote the same components in the drawings, and a detailed description of generally known function and structure of the present invention will be avoided lest it should obscure the subject matter of the present invention.

What is claimed is:

1. In a voice/data vocoding device for a mobile communication system, a device for scrambling voice and data in the mobile communication system comprising:

a controller for generating an operational mode control signal to control an operational mode of the voice and data, a scrambling key feeding control signal to control data scrambling, and a sync signal generation control signal;

an operational mode processor for vocoding or bypassing a voice/data packet received from a radio channel interval, based on the operational mode control signal of the controller, wherein the operational mode processor outputs an unscrambled vocoded PCM (pulse code modulation) signal or an unscrambled bypassed voice/data packet signal;

a random number generator for generating a random number based on the scrambling key feeding control signal of the controller;

a sync signal transmitter for generating a sync signal based on the sync signal generation control signal of the controller, and sending the generated sync signal to a cable channel interval; and a scrambler for scrambling the unscrambled vocoded PCM signal or the unscrambled bypassed voice/data packet of the operational mode processor using the random number generated from the random number generator and, after complete transmission of the sync signal, sending the scrambled PCM signal or voice/data packet to the cable channel interval.

2. The device as claimed in claim 1, further comprising a switching block switched to the sync signal generator under the control of the controller to send the sync signal generated from the sync signal generator to the cable channel interval and, after complete transmission of the sync signal, switched to the scrambler according to the control signal of the controller to send the scrambled signal to the cable channel interval.

3. The device as claimed in claim 1, further comprising a scrambling key feeder for feeding the stored scrambling key to the random number generator based on the control signal of the controller.

4. The device as claimed in claim 1, wherein the random number generated from the random number generator includes positional information for scrambling the unscrambled vocoded PCM signal or the unscrambled bypassed voice/data packet of the operational mode processor.

5. In a voice/data vocoding device for a mobile communication system, a device for descrambling voice and data in the mobile communication system comprising:

a sync signal detector for detecting a sync signal from a scrambled signal received from a cable channel interval;

a controller for generating a descrambling control signal, an operational mode control signal, and a descrambling key feeding control signal, upon detection of the sync signal at the sync signal detector;

a random number generator for generating a random number based on the descrambling key feeding control signal of the controller;

a descrambler for descrambling the scrambled signal received from the cable channel interval using the random number generated from the random number generator, based on the descrambling control signal of the controller, and wherein the descrambler outputs a descrambled PCM signal; and an operational mode processor for vocoding the descrambled PCM signal of the descrambler into a packet or bypassing a voice/data packet, based on the operational mode control signal of the controller, and then sending the descrambled vocoded PCM signal or the descrambled bypassed voice/data packet to a radio channel interval.

6. The device as claimed in claim 5, further comprising a switching block for switching the scrambled signal received from the cable channel interval to the descrambler, based on the control signal of the controller.

7. The device as claimed in claim 5, further comprising a descrambling key feeder for feeding the stored descrambling key to the random number generator based on the control signal of the controller.

8. The device as claimed in claim 5, wherein the random number generated from the random number generator includes positional information for descrambling the PCM signal or voice/data packet received from the cable channel interval.

9. In a voice/data vocoding device for a mobile communication system, a device for scrambling/descrambling voice and data in the mobile communication system comprising:

an operational mode processor for vocoding or bypassing a voice/data packet received from a radio channel interval based on a received operational mode signal, wherein the operational mode processer outputs an unscrambled vocoded or unscrambled bypassed voice/data packet, and vocoding or bypassing a descrambled PCM signal or packet based on the operational mode signal, wherein the operational mode processor outputs a descrambled vocoded or descrambled bypassed voice/data packet;

a random number generator for generating a random number based on a received scrambling and descrambling key feeding control signal;

a sync signal transmitter for generating a sync signal based on a received control signal, and sending the generated sync signal to a cable channel interval;

a scrambler for scrambling the unscrambled vocoded PCM signal or the unscrambled bypassed voice/data packet of the operational mode processor using the random number generated from the random number generator and, after complete transmission of the sync signal, sending the scrambled PCM signal or voice/data packet to the cable channel interval;

a sync signal detector for detecting a sync signal from the scrambled signal received from the cable channel interval;

a descrambler for descrambling the scrambled signal received from the cable channel interval using the random number generated from the random number generator, based on a received descrambling control signal; and a controller for generating the descrambling control signal to the descrambler, the scrambling and descrambling key feeding control signal, and the sync signal generation control signal, upon detection of the sync signal at the sync signal detector.

10. The device as claimed in claim 9, further comprising a descrambling key feeder for feeding the stored scrambling and descrambling keys to the random number generator based on the control signal of the controller.

11. In a voice/data vocoding method for a mobile communication system, a method for scrambling voice and data in the mobile communication system comprising the steps of:

vocoding or bypassing a voice/data packet received from a radio channel interval based on a received operational mode signal so as to form a mode-processed signal;

generating a defined random number based on scrambling key information;

generating a sync signal and sending the generated sync signal to a cable channel interval; and upon complete transmission of the sync signal, scrambling the mode-processed signal (including a PCM signal, or bypassed voice/data packet) using the random number and sending the scrambled signal to the cable channel interval.

12. In a voice/data vocoding method for a mobile communication system, a method for descrambling voice and data in the mobile communication system comprising the steps of:

receiving a scrambled signal from a cable channel interval;

upon receiving the scrambled signal, detecting a sync signal from the scrambled signal;

upon detection of the sync signal, generating a random number based on a descrambling key signal;

descrambling the scrambled signal using the random number; and vocoding a descrambled PCM signal or bypassing a descrambled packet based on an operational mode signal, and sending the descrambled vocoded PCM signal or the descrambled bypassed packet to a radio channel interval.

* * * * *